UNITED STATES PATENT OFFICE.

ISAAC LOWTHIAN BELL, OF ROUNTON GRANGE, ENGLAND.

IMPROVEMENT IN MANUFACTURE OF IRON AND STEEL.

Specification forming part of Letters Patent No. 198,733, dated January 1, 1878; application filed October 29, 1877.

*To all whom it may concern:*

Be it known that I, ISAAC LOWTHIAN BELL, of Rounton Grange, in the county of York, England, have invented new and useful Improvements in the Manufacture of Iron and Steel, which improvements are fully set forth in the following specification.

My said invention has for its object the more effectually ridding of crude or pig iron of its associated phosphorus than can with the same degree of certainty or completeness be effected by the means at present in use.

For this purpose the cast-iron is employed direct from the blast-furnace, or is melted in a foundry-cupola, or in any of the well-known forms of apparatus for the fusion of metals.

The agent I make use of for the removal of the phosphorus is oxide of iron, as it exists in the ores of this metal, or as it occurs in certain by-products from other manufacturing operations. Among these latter may be cited slags from puddling, balling, and other furnaces found in malleable-iron works, or other factitious substances in which oxide of iron is found in sufficient quantity for my purpose. In the selection of the oxide of iron or compounds containing it I prefer, for obvious reasons, those in which sulphur and phosphorus do not occur in excessive quantities.

The oxide of iron may be melted in a cupola or other form of furnace for obtaining a sufficiently high temperature. When a cupola or other kind of blast-furnace is employed, care must be taken not to raise the heat to that point which would cause too copious a reduction of the oxide of iron to the metallic state, as I prefer simply fusing the compound containing the oxide.

Should the oxide of iron employed for carrying out my invention consist of this substance in so pure a form as to be easily reduced to the metallic condition, I prefer adding silica or other earthy substance, either free or combined with oxide of iron, as they are found in iron ores or iron slags, so as to insure fusion at that temperature I find best suited for my purpose.

I have found that when the heat of the iron and of the oxide resembles that at which the metal is used for foundry purposes it answers extremely well.

The streams of melted oxide of iron and of cast-iron may be conducted either separately or together into a vessel intended for blending the two. It is obvious that many forms of apparatus may be used for this purpose. A revolving furnace, such as that proposed by Mr. Danks, or by Mr. Crampton, for puddling iron, or that devised by Messrs. Godfrey and Howson for a similar object, enables the operator to bring the two fluids rapidly into that intimate contact which is required for the process. Any of these forms of furnaces also afford the means of warming up the vessel in which the iron and oxide of iron are to be brought together, so as to prevent the mixture being too rapidly cooled by the sides of the apparatus; or, in case it is desirable to retard the cooling of the contents of the vessel, this can easily be done by the means used for maintaining a high temperature when any of these furnaces are used for puddling iron.

The operation is continued at the moderate temperature hereinbefore described, care being taken to keep it below that point at which carbon is rapidly removed from cast-iron, for it is essential to the success of my invention that the phosphorus should be almost entirely oxidized and transferred to the oxide of iron before the carbon has been greatly reduced in quantity.

In practice I have found, as already stated, that when the iron and oxide are brought together at the temperature, or thereabout, at which metal is run in an iron foundry, the cast-iron under treatment loses almost the whole of its phosphorus, as well as the greater portion of its silicon and sulphur, before its carbon has been so lessened in quantity as to deprive it of its power to remain in a fluid condition before the close of the operation.

In the event of the pig-iron containing an unusual percentage of phosphorus, or of the action being such as to incur a risk of the materials being thr wn out of the vessel by the ebullition, the fluid cast-iron for each operation may be added a. twice, or oftener, according to the nature of the case.

The quantity of oxide of iron employed should at least be sufficient to take up the phosphorus of the iron without itself becoming unduly charged with this impurity; and I consider that when the percentage of phosphorus amounts to seven per cent., the oxide of iron becomes unfit for use, or, at least that the employment of so impure an oxide is undesirable.

When the two substances have been long enough in contact to effect the separation of the phosphorus, which generally happens in about five or ten minutes, the purified cast-iron can be run out by a properly-constructed tapping-hole, if a Danks' furnace, or one similar in principle, is employed, or by inclining the revolving vessel, which is easily accomplished when the puddling-furnace, according to the construction patented by Messrs. Godfrey and Howson, is made use of.

Both oxide and iron can be run out, received in molds, and separated in the manner practised in an ordinary refinery or running-out fire; or, if the oxide is not so saturated with phosphorus that its action in purifying more iron is not seriously impaired, a portion of it can be retained in the vessel, and an additional quantity added, varying in amount according to circumstances, after which the operation must be conducted in the manner already described.

The purified iron may, in case it is so desired, be run direct into a furnace or other form of apparatus, and converted direct into malleable iron, or into steel, by any of the well-known methods in use for either of these processes.

Although the separation of carbon from cast-iron is greatly retarded by the low temperature at which phosphorus is best carried off by oxide of iron, if the operation be continued sufficiently long the carbon may be so reduced in quantity that the iron is converted into steel, or, if continued a still longer time, it passes into iron in its malleable form.

Before applying the requisite heat, in order to fuse or weld the steel or iron, as the case may be, I prefer separating, as far as possible, the adhering oxide or cinder, because, in raising the temperature to effect either of these objects, a portion of the phosphorus is extremely apt to pass back again from the cinder to the steel or iron.

The separation of cinder from metal can be accomplished either by compression under a hammer or squeezer. It may also be done by immersing the metal in any easily-fusible compound, such as a silicate of lime and alumina, to which an alkali may or may not be added. By this last-mentioned method the metal is, in a great measure, cleansed from the oxide or cinder, after which it may be brought to a welding-heat, or melted into ingots in any of the well-known forms of furnace used for these objects.

Thus it will be seen that my method of treatment is essentially as follows: Melted cast-iron is intimately mixed with melted oxide of iron in a furnace or vessel in which they are maintained at a suitable temperature, such that no rapid separation of the carbon from the metal takes place while the phosphorus, for the most part, passes from the metal to the oxide, which, having thus become contaminated, is removed from the metal either before the cast-iron is, by the separation of carbon, converted into steel or wrought-iron; or, if the oxide so contaminated is not removed before the conversion of the cast-iron into wrought-iron or steel, then it is removed before the heat is applied requisite to weld the iron or fuse the steel.

Having thus described the nature of my said invention, and the manner of performing the same, I would have it understood that I claim—

1. As an improvement in the manufacture of iron and steel, the hereinbefore-described method of separating phosphorus from cast-iron, which consists in separately fusing cast-iron and oxide of iron, running or mixing together the melted cast-iron and the melted oxide of iron in a blending-vessel, and maintaining the temperature of the mixture at a point below that at which a rapid separation of the carbon from the iron takes place, until the phosphorus is oxidized and transferred to the oxide of iron, preparatory to the separation or removal of the contaminated oxide of iron from the metal, substantially as set forth.

2. The hereinbefore-described method of manufacturing iron and steel, which consists in blending together melted oxide of iron and melted cast-iron, maintaining the mixture at a temperature sufficiently low to prevent a too great reduction of the carbon while causing the transfer of the phosphorus from the metal to the oxide of iron, and finally converting the metal into steel or malleable iron, substantially as set forth.

I. LOWTHIAN BELL.

Witnesses:
HENRY PARRINGTON,
  Solr., Middlesbrough.
JAS. L. ADAMS,
  Clerk to Messrs. Belk & Parrington,
  Solicitors, Middlesbrough.